Jan. 7, 1964  W. PALLACH  3,116,740
HEAD MOLD FOR THE ROLLING MOLD IN A CIGAR MAKING MACHINE
Filed May 29, 1961  2 Sheets-Sheet 1

Jan. 7, 1964 W. PALLACH 3,116,740
HEAD MOLD FOR THE ROLLING MOLD IN A CIGAR MAKING MACHINE
Filed May 29, 1961 2 Sheets-Sheet 2

3,116,740
HEAD MOLD FOR THE ROLLING MOLD IN A CIGAR MAKING MACHINE
Walter Pallach, Hamburg-Bergedorf, Germany, assignor to Hauni-Werke Körber & Co. K.G., Hamburg-Bergedorf, Germany
Filed May 29, 1961, Ser. No. 113,311
Claims priority, application Germany June 1, 1960
4 Claims. (Cl. 131—30)

The invention relates to cigar manufacture and particularly is directed to means for rolling the wrapper around the head end of the filler.

In cigar making machines the rolling of the wrapper around the head end of the filler is particularly difficult when the filler and its head have a predetermined profile. It is customary to employ at the end of the rolling mold of a cigar making machine so-called additional head molds, the generating lines of which may be semi-circles, three-quarter circles or parabolic.

The head molds with three-quarter circles and parabolic shapes on account of their larger guide surfaces for the wrapping of the wrapper around the filler are much better than the head molds having a semi-circular form. However, the former head molds have to be controlled in synchronism with the other parts of the machine, and they have to be axially displaced for permitting a discharge or expulsion of the completed cigar.

Semi-circular head molds do not have this disadvantage, but they have the drawback that for the rolling of the wrapper around the head end of the filler additional supporting means have to be provided—see Swiss patent specification No. 169,032—such as rollers which in turn have to be adjusted in accordance with the particular profile of the filler.

It is an object of the invention to overcome this disadvantage of the semi-circular head molds and to eliminate any movable and adjustable supporting means and guiding means for the end of the wrapper which covers the head end of the filler by making the side walls of the head mold, which project above the axis of the filler, of U-shape in plan view, while the generating line of the mold extends tangentially to the mold cavity. Furthermore, the side wall of the head mold over which the wrapper is guided is provided with a guide surface and an adherence surface is angularly displaced with reference to the feeding plane of the wrapper so that the end of the wrapper may be pressed against said adherence surface and pulled away from the latter during the final stage of wrapping this end of the wrapper around the profiled head end of the filler.

It is, therefore, an object of the invention to provide a cigar rolling machine with only stationary guide means for wrapping the end of the wrapper around the head end of the filler. This has the advantage that due to the absence of any edge of the head mould, touching the press seam of the filler, fillers may be wrapped without danger of bursting the head.

Owing to the angular folding of the end of the wrapper prior to the delivery of this end of the wrapper to the rolling mold, for instance by means of a suction head on a swivel arm, any adjustable mechanism and movable guide means are made superfluous. When a change of the profile of the head end of the cigar is desired, only the head mold requires to be changed but not any adjustable control and supporting and guide means.

Another object of the invention is therefore a head mold for the rolling mold of a cigar making machine, which head mold has a bottom whose generating line is semi-circular and having side walls extending U-shaped in plan view above the rolling axis of the filler and extending tangentially to the mold generating line, one of said side walls facing the wrapper which is fed toward said mold and merging into a curved guide surface which in turn is connected with an adherence surface forming with a supporting surface for said wrapper an angle, said adherence surface being engaged by the end of said wrapper which is pulled from said adherence surface when moving into said head mold.

It is also an object of the invention to provide means for directing compressed air against the end of said wrapper so as to cause the same to engage said adherence surface.

Still another object of the invention is a head mold for the rolling mold of a cigar making machine, in which one of the side walls facing the wrapper which is fed toward said mold merges into a curved guide surface which in turn is connected with an adherence surface forming with a supporting surface for said wrapper an angle of substantially 90°.

It is also an object of the invention to provide a head mold for the rolling mold of a cigar making machine, in which one of the side walls facing the wrapper which is fed toward said mold merges into a curved guide surface which in turn is connected with an adherence surface forming with a supporting surface for said wrapper an angle, said adherence surface being engaged by the end of said wrapper which is pulled from said adherence surface when moving into said head mold, said supporting surface and said adherence surface being connected with one another by a convex surface.

With these and other objects in view, as will appear hereinafter, the invention will now be described in greater detail with reference to the accompanying drawings which illustrate by way of example two embodiments of the invention.

Figure 1:
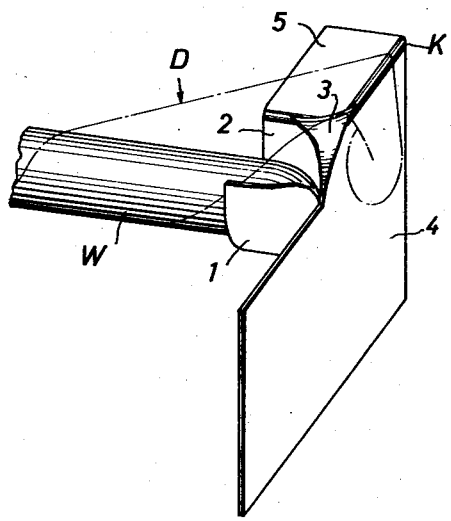
FIG. 1 illustrates a head mold for a cigar making machine with right angular folding of the end of the wrapper.

Referring to the drawing, the filler W in the rolling mold is arranged with its head end $W_1$ in engagement with the head mold having side walls 1 and 2 the generating lines of which are semi-circular. In accordance with the invention, the portions of the side walls 1 and 2 which extend upwardly from the horizontal axis of the filler W are approximately U-shaped in plan view and extend tangentially with reference to the remainder of the bottom. Furthermore, the side wall 2 is provided with a guide surface 3 which according to the shape of the filler merges somewhat helically with the side wall 2 of the head mold.

On the feeding side of the wrapper D which is shown in dash-and-dot lines is arranged a horizontal supporting surface 5 which merges into the helically shaped guide surface 3. An adherence surface 4 is arranged at right angles or substantially at right angles to the horizontal supporting surface 5. When the wrapper end, which in conventional manner is covered with an adhesive, during the rotative movement of the filler W is rolled upon the filler and comes into the range of the rolling head, then the invention provides that the wrapper D will be folded downwardly by compressed air supplied by pipe 10 through suction head 9 about the edge K formed between the supporting surface 5 and the adherence surface 4. This folding of the wrapper D is accomplished by this compressed air and as a result of this operation the outer portion D₁ is pressed against the surface 4. During the continuous rotation of the filler W within the common mold 11 with four rolling elements 12, 13, 14, 15 the wrapper D is pulled over the edge K and the guide surface 3 into the head mold formed by the walls 1 and 2 and is wrapped around the head end of the filler W as illustrated in FIGS. 4–7.

Figure 2:
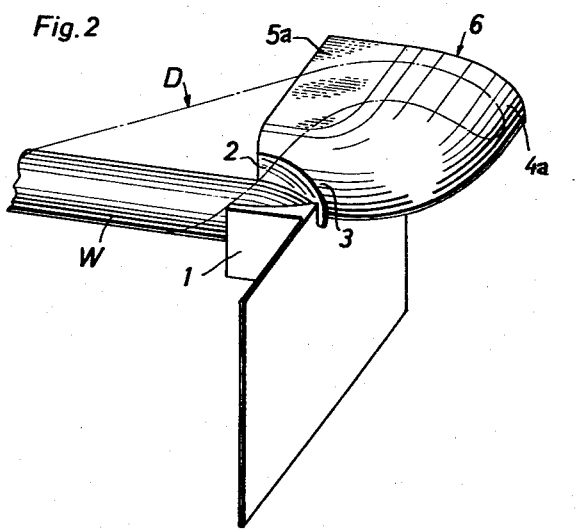
FIG. 2 illustrates a modified arrangement in which the end of the wrapper is folded over a curved folding and guide surface.
Figure 3:
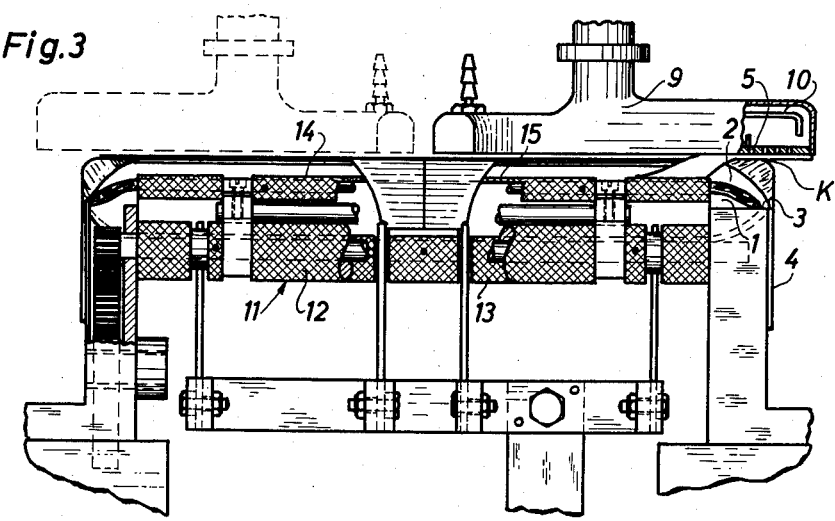
FIG. 3 illustrates a rolling mould of a cigar making machine for filler with double length, including the head mould which is particularly shown in FIG. 1.
Figure 4:
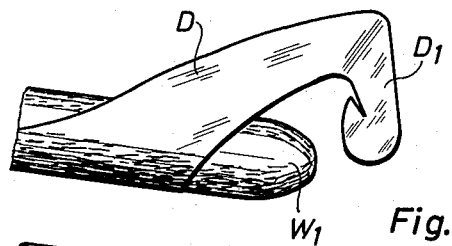
FIGS. 4–7 illustrate the consecutive stages of wrapping a filler according to FIG. 1, and FIGS. 8–10 illustrate the consecutive stages of wrapping a filler according to FIG. 2.
Figure 5:
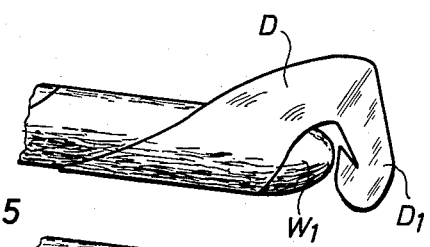
Figure 6:
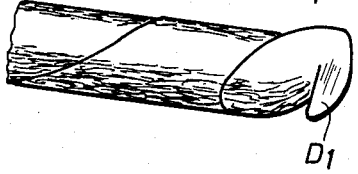
Figure 7:
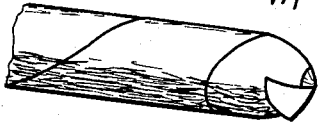
Figure 8:
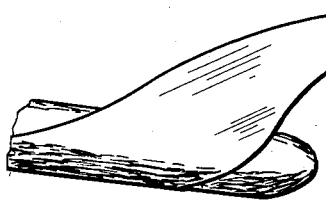
Figure 9:
Figure 10:

In FIG. 2 is illustrated a modified construction of the head mold which is ball-shaped for wrapping another type of cigar. In this modified construction the supporting surface 5a and the adherence surface 4a are connected by a continuous predetermined convex surface 6. The wrapping procedure will be accomplished as illustrated in FIGS. 8–10.

What I claim is:

1. A head mold for the rolling mold of a cigar making machine in which a wrapper is rolled on a tobacco filler, said head mold having a bottom whose generating line is semicircular, said bottom comprising side walls having portions which are U-shaped in plan view, which extend beyond a plane passing through the rolling axis of the filler and which are tangential with reference to the remainder of the bottom, one of said side walls facing the wrapper which is fed toward said mold and merging into a curved guide surface which in turn is connected with an adherence surface forming an angle with a supporting surface for said wrapper, said adherence surface being engaged by the end of said wrapper which is pulled from said adherence surface when moving into said head mold.

2. A head mold for the rolling mold of a cigar making machine in which a wrapper is rolled on a tobacco filler, said head mold having a bottom whose generating line is semicircular, said bottom comprising side walls having portions which are U-shaped in plan view, which extend beyond a plane passing through the rolling axis of the filler and which are tangential with reference to the remainder of the bottom, one of said side walls facing the wrapper which is fed toward said mold and merging into a curved guide surface which in turn is connected with an adherence surface forming an angle with a supporting surface for said wrapper, said adherence surface being engaged by the end of said wrapper which is pulled from said adherence surface when moving into said head mold, and including means for directing compressed air against the end of said wrapper so as to cause the same to engage said adherence surface.

3. A head mold for the rolling mold of a cigar making machine in which a wrapper is rolled on a tobacco filler, said head mold having a bottom whose generating line is semicircular, said bottom comprising side walls having portions which are U-shaped in plan view, which extend beyond a plane passing through the rolling axis of the filler and which are tangential with reference to the remainder of the bottom, one of said side walls facing the wrapper which is fed toward said mold and merging into a curved guide surface which in turn is connected with an adherence surface forming an angle with a supporting surface for said wrapper of substantially 90°, said adherence surface being engaged by the end of said wrapper which is pulled from said adherence surface when moving into said head mold.

4. A head mold for the rolling mold of a cigar making machine in which a wrapper is rolled on a tobacco filler, said head mold having a bottom whose generating line is semicircular, said bottom comprising side walls having portions which are U-shaped in plan view, which extend beyond a plane passing through the rolling axis of the filler and which are tangential with reference to the remainder of the bottom, one of said side walls facing the wrapper which is fed toward said mold and merging into a curved guide surface which in turn is connected with an adherence surface forming an angle with a supporting surface for said wrapper, said adherence surface being engaged by the end of said wrapper which is pulled from said adherence surface when moving into said head mold, said supporting surface and said adherence surface being connected with one another by a convex surface.

References Cited in the file of this patent

UNITED STATES PATENTS

| | | |
|---|---|---|
| 414,572 | Pennycook | Nov. 5, 1889 |
| 617,366 | Snavely et al. | Jan. 10, 1899 |
| 683,493 | Pisko | Oct. 1, 1901 |
| 829,019 | Knight | Aug. 21, 1906 |
| 2,369,777 | Durning | Feb. 20, 1945 |

FOREIGN PATENTS

| | | |
|---|---|---|
| 19,166 | Great Britain | 1902 |